US008849079B2

(12) United States Patent
Yoshida et al.

(10) Patent No.: US 8,849,079 B2
(45) Date of Patent: Sep. 30, 2014

(54) LIGHT DIFFUSING ELEMENT AND LIGHT GUIDE FOR ENDOSCOPES EQUIPPED WITH THE LIGHT DIFFUSING ELEMENT

(75) Inventors: Koji Yoshida, Kanagawa-ken (JP); Tadashi Kasamatsu, Kanagawa-ken (JP); Tatsuya Yoshihiro, Kanagawa-ken (JP)

(73) Assignee: Fujifilm Corporation, Tokyo (JP)

(*) Notice: Subject to any disclaimer, the term of this patent is extended or adjusted under 35 U.S.C. 154(b) by 229 days.

(21) Appl. No.: 13/220,534

(22) Filed: Aug. 29, 2011

(65) Prior Publication Data
US 2012/0051693 A1    Mar. 1, 2012

(30) Foreign Application Priority Data
Aug. 31, 2010  (JP) ................................. 2010-194940

(51) Int. Cl.
G02B 6/26     (2006.01)
F21V 8/00     (2006.01)
G02B 5/02     (2006.01)
G02B 23/24    (2006.01)
G02B 6/42     (2006.01)

(52) U.S. Cl.
CPC ................ G02B 5/02 (2013.01); G02B 6/0008 (2013.01); G02B 23/2469 (2013.01)
USPC ........................................................ 385/31

(58) Field of Classification Search
CPC .. G02B 5/0242; G02B 5/0284; G02B 5/0289; G02B 5/122; G02B 5/124; G02B 5/136; G02B 6/0051; G02B 6/2931; G02B 6/29311; G02B 6/29328; G02B 6/29329; G02B 23/26; A61B 18/22; A61B 1/00165; A61B 1/00163; A61B 1/002; A61B 1/06; A61B 1/00096; A61B 1/07

USPC ................. 606/17; 362/574, 558; 385/79
See application file for complete search history.

(56) References Cited

U.S. PATENT DOCUMENTS 4,266,534 A * 5/1981 Ogawa ........................... 600/177
4,733,937 A * 3/1988 Lia et al. ........................ 385/117

(Continued)

FOREIGN PATENT DOCUMENTS

JP  57-31834 (A)   2/1982
JP  1-185510 (A)   7/1989

(Continued)

OTHER PUBLICATIONS

English Translation of JP 57/031834.*

(Continued)

*Primary Examiner* — Rhonda Peace
(74) *Attorney, Agent, or Firm* — McGinn IP Law Group, PLLC (57) ABSTRACT

A light diffusing element diffuses light output from an output facet of an optical fiber that enters the light diffusing element at a first end and outputting the diffused light from a second end. The light diffusing element is equipped with a semireflective surface for reflecting a portion of the light, provided at a predetermined portion of the light diffusing element corresponding to the core of the output facet. The semireflective surface intersects at least with the optical axis of the optical fiber. Thereby, propagation of light in directions away from the optical axis of the optical fiber can be promoted during the step of reflecting the portion of the light that enters the light diffusing element.

12 Claims, 9 Drawing Sheets

(56) References Cited

U.S. PATENT DOCUMENTS

| | | | | |
|---|---|---|---|---|
| 4,824,225 | A * | 4/1989 | Nishioka | 359/718 |
| 4,852,567 | A * | 8/1989 | Sinofsky | 606/3 |
| 4,929,070 | A * | 5/1990 | Yokota et al. | 600/177 |
| 4,952,040 | A * | 8/1990 | Igarashi | 359/708 |
| 5,261,904 | A * | 11/1993 | Baker et al. | 606/17 |
| 5,321,781 | A * | 6/1994 | Cox | 385/36 |
| 5,431,647 | A * | 7/1995 | Purcell et al. | 606/16 |
| 6,424,765 | B1 * | 7/2002 | Harker | 385/31 |
| 6,569,088 | B2 | 5/2003 | Koshikawa | |
| 6,893,432 | B2 * | 5/2005 | Intintoli et al. | 606/2 |
| 7,274,847 | B2 * | 9/2007 | Gowda et al. | 385/117 |
| 7,412,141 | B2 * | 8/2008 | Gowda et al. | 385/117 |
| 7,609,927 | B2 * | 10/2009 | Gowda et al. | 385/117 |
| 2002/0138073 | A1 * | 9/2002 | Intintoli et al. | 606/15 |
| 2005/0078910 | A1 * | 4/2005 | Hickingbotham | 385/31 |
| 2005/0273090 | A1 * | 12/2005 | Nieman et al. | 606/15 |
| 2006/0104593 | A1 * | 5/2006 | Gowda et al. | 385/140 |
| 2008/0015560 | A1 * | 1/2008 | Gowda et al. | 606/15 |
| 2009/0240242 | A1 * | 9/2009 | Neuberger | 606/7 |
| 2009/0312609 | A1 | 12/2009 | Shimotsu | |
| 2010/0016930 | A1 * | 1/2010 | Gowda et al. | 607/88 |
| 2012/0051693 | A1 * | 3/2012 | Yoshida et al. | 385/31 |

FOREIGN PATENT DOCUMENTS

| | | |
|---|---|---|
| JP | 2001-166223 A | 6/2001 |
| JP | 2009-297188 (A) | 12/2009 |

OTHER PUBLICATIONS

Notice of Grounds for Rejection dated Oct. 15, 2013, with English translation.

* cited by examiner

LIGHT DIFFUSING ELEMENT AND LIGHT GUIDE FOR ENDOSCOPES EQUIPPED WITH THE LIGHT DIFFUSING ELEMENT

BACKGROUND OF THE INVENTION

1. Field of the Invention

The present invention is related to a light diffusing element that diffuses light output from an optical fiber. The present invention is also related to a light guide for an endoscope that guides illumination light to a portion to be observed, equipped with an optical fiber and the light diffusing element.

2. Description of the Related Art

Endoscope systems for observing tissue within body cavities are widely known. For example, endoscope systems that obtain visible images by imaging using white light to illuminate portions to be observed within body cavities and display the visible images on screens of monitors are in wide practical use.

Light guides for endoscopes for guiding illumination light into body cavities are utilized in the aforementioned endoscope systems. It is possible to utilize laser light sources as light sources for generating the illumination light.

There are cases that laser beams emitted by laser light sources will be harmful to human bodies due to their high power densities, even if the emission amount is low. Accordingly, in the case that a laser light source is utilized as an illumination light source, it is preferable to use a laser having the lowest level safety standard class as possible, from the viewpoint of safety of operating sites. Commonly, light diffusing elements (referred to as "light diffusing elements" or "holographic diffusers") that diffuse light output from optical fibers are provided in the vicinity of output ends of the optical fibers, in order to decrease the level of the safety standard class. Light emitting surfaces at output surfaces of the light diffusing elements diffuse light, and become a two dimensional light source having a large light emitting area. In such cases, the light emitting surfaces of the light diffusing elements being of sizes corresponding to the outputs of laser beams is a requirement to satisfy safety standards.

Meanwhile, miniaturization of light guides for endoscopes is advancing, for the reasons of improving operability, endurance, and the like.

U.S. Pat. No. 6,569,088 discloses a light diffusing element having a two dimensional shape that maximally utilizes dead space at the distal end layout of a light guide for an endoscope, in order to secure a large light emitting surface for the light diffusing element while miniaturizing the light guide for an endoscope.

Figure 12:
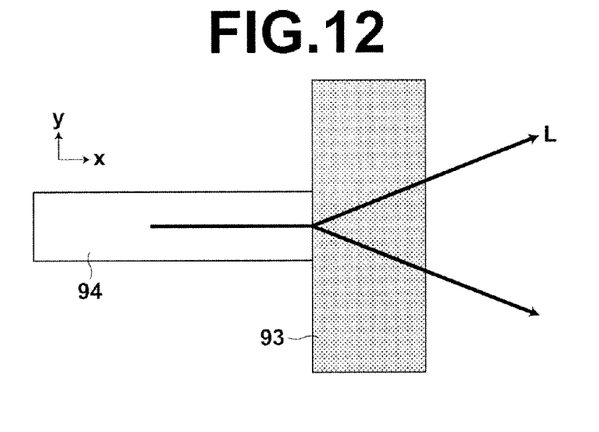
FIG. 12 is a sectional diagram that schematically illustrates a conventional light guide for an endoscope.

However, if the two dimensional size of the light dispersion element is merely increased to be larger than an output end of an optical fiber as in U.S. Pat. No. 6,569,088, there is a problem that light L cannot reach parts of a light diffusing element 93 away from the optical axis of an optical fiber 94, as illustrated in FIG. 12.

SUMMARY OF THE INVENTION

The present invention has been developed in view of the foregoing circumstances. It is an object of the present invention to provide a light diffusing element that diffuses light output from an optical fiber and a light guide for an endoscope equipped with the light diffusing element, that enable light to reach portions of the light diffusing element away from the optical axis of the optical fiber.

A light diffusing element of the present invention that achieves the above object is a light diffusing element, for diffusing light output from the output facet of an optical fiber that enters the light diffusing element at a first end and outputting the diffused light from a second end, comprising:

the first end;

the second end; and a semireflective surface for reflecting a portion of the light, provided at a predetermined portion of the light diffusing element corresponding to the core of the output facet, the semireflective surface intersecting at least with the optical axis of the optical fiber.

In the present specification the term "semireflective surface" refers to a surface that reflects a portion of light incident thereon.

The phrase "reflects a portion of light" refers to reflecting a portion of light that reaches the semireflective surface.

In the light diffusing element of the present invention, it is preferable for the semireflective surface to reflect the portion of the light rearward.

In the present specification, the term "rearward" refers to a direction opposite a "frontward" direction. Here, the term "frontward" refers to the direction that light output from the output end of the optical fiber propagates, between the two directions parallel to the optical axis of the optical fiber. That is, the term "rearward" refers to the other of the two directions parallel to the optical axis of the optical fiber.

The phrase "reflect the portion of the light rearward" refers to reflecting the portion of the light such that wavelength vector components of the light parallel to the optical axis of the optical fiber are directed rearward.

It is preferable for the semireflective surface to be shaped as a protrusion that protrudes rearward. In this case, it is preferable for the semireflective surface to be of a conical shape. Further, it is particularly preferable for the semireflective surface to be of a polygonal conical shape constituted by a plurality of surfaces.

The semireflective surface may be formed by a semireflective film provided on the predetermined portion of a dispersion output surface, from which the light is output. Alternatively, the semireflective surface may be an interface between materials having different refractive indices.

It is preferable for the light diffusing element of the present invention to further comprise:

a totally reflective film which is coated on a surface, such that the light reflected by the semireflective surface, which is a first reflective surface, is reflected frontward.

It is preferable for the light diffusing element of the present invention to further comprise:

a second reflective surface, for reflecting a portion of the light reflected by the semireflective surface, which is a first reflective surface, frontward.

In the present specification, the phrase "reflecting a portion of the light . . . frontward" refers to refers to reflecting the portion of the light such that wavelength vector components of the light parallel to the optical axis of the optical fiber are directed frontward.

In the present specification, the term "totally reflective film" refers to a film that reflects a large portion of light incident thereon.

Further, a light guide for an endoscope of the present invention diffuses light which is output from an output facet of an optical fiber and enters the light guide at a first end and outputs the diffused light from a second end, and comprises:

the optical fiber; and a light diffusing element;

the light diffusing element being equipped with a semireflective surface for reflecting a portion of the light, provided at a predetermined portion of the light diffusing element corresponding to the core of the output facet, the semireflective surface intersecting at least with the optical axis of the optical fiber.

In the light guide for an endoscope of the present invention, it is preferable for the semireflective surface to reflect the portion of the light rearward.

It is preferable for the semireflective surface to be shaped as a protrusion that protrudes rearward. In this case, it is more preferable for the semireflective surface to be of a conical shape. Further, it is particularly preferable for the semireflective surface to be of a polygonal conical shape constituted by a plurality of surfaces.

It is preferable for the light guide for an endoscope of the present invention to further comprise:

a totally reflective film which is coated on a surface, such that the light reflected by the semireflective surface, which is a first reflective surface, is reflected frontward.

It is preferable for the light guide for an endoscope of the present invention to further comprise:

a reflective member, for reflecting a portion of the light reflected by the semireflective surface, which is a first reflective surface, frontward.

In the light guide for an endoscope of the present invention, it is preferable for the optical fiber has a tapered portion in the vicinity of the output facet such that the core of the optical fiber is of a tapered shape that becomes thinner toward the output facet.

In the light guide for an endoscope of the present invention, it is preferable for the optical fiber and the light diffusing element to be separated by a predetermined distance.

The light diffusing element of the present invention and the light guide for an endoscope equipped with the light diffusing element have the semireflective surface that reflects a portion of the light, provided to intersect with at least the optical axis of the optical fiber. Thereby, propagation of light in directions away from the optical axis of the optical fiber can be promoted during the step of reflecting the portion of the light that enters the light diffusing element. As a result, it becomes possible for light to reach portions of the light diffusing element away from the optical axis of the optical fiber, in the light diffusing element and the light guide for an endoscope equipped with the light diffusing element.

DESCRIPTION OF THE PREFERRED EMBODIMENTS

Hereinafter, embodiments of the present invention will be described with reference to the attached drawings. However, the present invention is not limited to the embodiments to be described below. Note that the dimensions, scale, etc. of constituent elements in the drawings may differ from the actual dimensions, scale, etc., in order to facilitate visual understanding.

[Embodiments of Light Diffusing Element and Light Guide for an Endoscope Equipped with the Light Diffusing Element]

Figure 1:
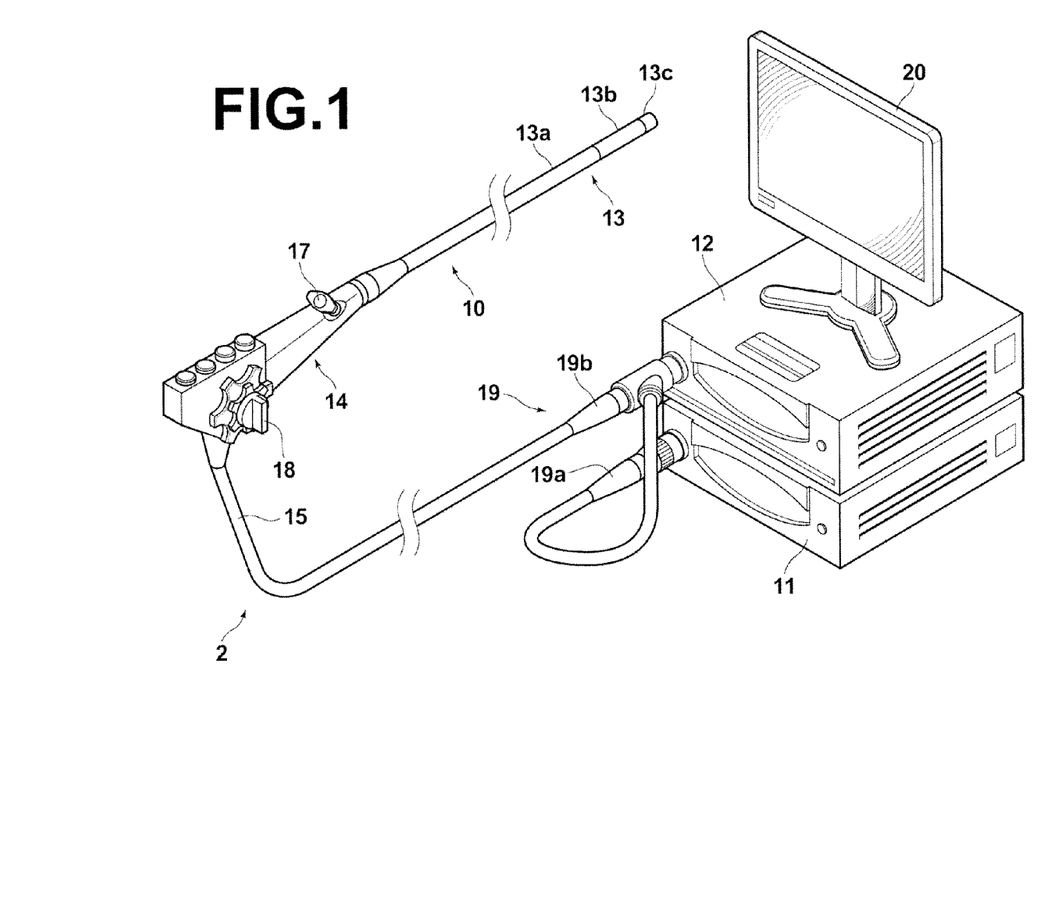
FIG. 1 is a diagram that illustrates the outer appearance of an endoscope system that employs a light guide for an endoscope of the present invention.

A light diffusing element according to a first embodiment and a light guide for an endoscope equipped with the light diffusing element are utilized in an endoscope system 2 such as that illustrated in FIG. 1. As illustrated in FIG. 1, the endoscope system 2 is constituted by: an electronic endoscope 10 for obtaining images of portions to be observed within the bodies (body cavities) of subjects; a processing apparatus 11 for generating endoscope images; and a light source apparatus 12 that supplies illumination light for illuminating the interiors of the body cavities. A monitor 20 for displaying the endoscope images is connected to the processing apparatus 11.

The electronic endoscope 10 is equipped with: a probe portion 13 to be inserted into body cavities; an operating portion 14 which is provided at the base end of the probe 13; and a universal cord 15 that extends from the operating portion 14. The probe portion 13 is constituted by: a long thin flexible tube portion 13a; a bight portion formed by a plurality of linked bight pieces; and a tip portion 13c positioned at the distal end of the probe portion 13. The tip portion 13c is formed by a rigid metal material or the like, and houses a CCD 30 (refer to FIG. 2) or the like for obtaining images within the body cavities therein.

The operating portion 14 is equipped with a forceps opening 17, an angle knob 18, and the like. The forceps opening 17 is linked to a forceps outlet 27 (refer to FIG. 2) formed in the tip portion 13c. Treatment implements are inserted through the forceps opening 17, and caused to protrude into the body cavities through the forceps outlet 27. The angle knob 18 is connected to the bight portion 13b via wires provided within the probe portion 13. The bight portion 13b bends to moves in the vertical and horizontal directions by pushing and pulling the wires by manipulating the angle knob 18. Thereby, the tip portion 13c can be oriented toward desired directions within the body cavities.

A connector 19 is provided at the extended end of the universal cord 15. The connector 19 is a combination type connector constituted by a communications connector 19a and a light source connector 19b, and is capable of being removably connected to the processing apparatus 11 and the light source apparatus 12.

Figure 2:
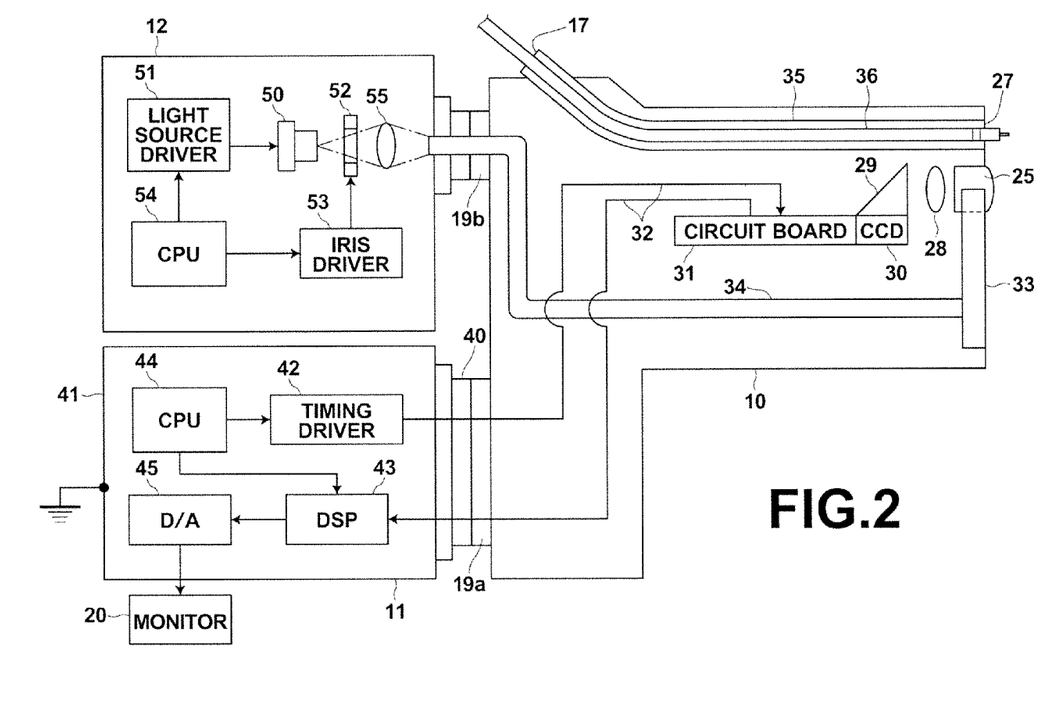
FIG. 2 is a diagram that schematically illustrates the inner structures of the endoscope system that employs the light guide for an endoscope of the present invention.
Figure 3:
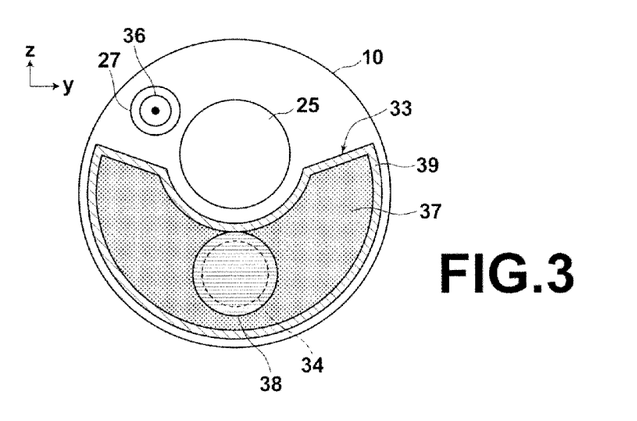
FIG. 3 is a diagram that schematically illustrates the outer appearance of structures in the case that the tip of an endoscope probe portion of the present invention is viewed from the front.

As illustrated in FIG. 2 and FIG. 3, an objective lens 25 that receives and focuses image light of subjects, a light diffusing element 33 that outputs diffused illumination light, and the forceps outlet 27 are provided on the distal end surface of the tip portion 13c of the electronic endoscope 10. A light guiding optical system 28 and a prism 29 are provided to the rear of the objective lens 25. The CCD 30 is provided directly beneath the prism 29, and the CCD 30 is connected to a circuit board 31. Image light of subjects which has passed through the light guiding optical system 28 and the prism 29 enters a light receiving surface of the CCD 30. The CCD 30 outputs image signals based on the image light that enters the light receiving surface, and inputs the image signals to the circuit board 31.

The circuit board 31 is connected to a timing/driver circuit 42 and a digital signal processing circuit 43 (DSP 43) of the processing apparatus 11 via signal cables 32. The circuit board 31 is equipped with an analog signal processing circuit (not shown). The analog signal processing circuit administers a correlated double sampling process on the image signals input from the CCD 30, to remove reset noise and amplifier noise. Then, the image signals, from which noise has been removed, are amplified at a predetermined gain then converted to digital signals having a predetermined number of bits. The digital image signals are input to the DSP 43 of the processing apparatus 11 via the signal cables 32.

Figure 4:
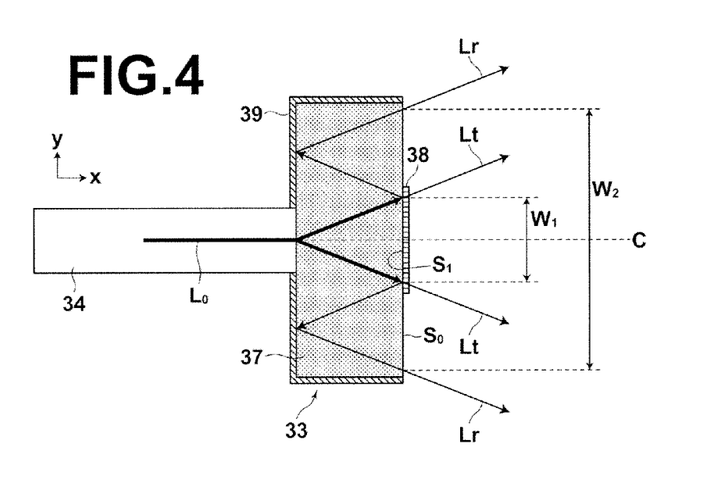
FIG. 4 is a sectional diagram that schematically illustrates a first embodiment of the light guide for an endoscope of the present invention.

The light diffusing element 33 is provided as an illuminating window for illumination light at the distal end surface of the tip portion 13c of the electronic endoscope 10. The light diffusing element 33 of the first embodiment is constituted by a light transmitting member 37 in which fine scattering particles are dispersed, a semireflective film 38, and a totally reflective film 39, as illustrated in FIG. 3 and FIG. 4. The light diffusing element 33 is of a shape that effectively utilizes dead space within the distal end layout of the light guide for an endoscope, as illustrated in FIG. 3. Thereby, the light diffusing element 33 is of a larger two dimensional size than an output facet of an optical fiber 34, which is a light guide for the endoscope, when viewed in the direction of the optical axis of the optical fiber 34. The light transmitting member 37 is produced by dispersing polystyrene beads having diameters of 0.5 µm to 10 µm or fine bubbles within a light transmitting material such as glass or resin, then performing molding.

The semireflective film 38 forms a semireflective surface $S_1$ on a light output surface $S_0$ of the light diffusing element 33. The semireflective film 38 may be a mesh or a dotted film formed by metal, for example. The semireflective film 38 may be provided on the surface of the light transmitting member 37 as illustrated in FIG. 3, or provided within the light transmitting member 37.

The totally reflective film 39 reflects substantially all of the light reflected rearward by the semireflective film 38 frontward. The totally reflective film 39 may be a thickly formed metal film, for example. The totally reflective film 39 is not necessarily an indispensable element of the light diffusing element 33. However, rearwardly reflected light can be more efficiently reflected frontward by providing the totally reflective film 39. The output facet of the optical fiber 34, which functions as a light guide, is provided to face the light diffusing element 33.

The optical fiber 34 penetrates through the probe portion 13, the operating portion 14, and the interior of the universal cord 15, and an input facet thereof protrudes out of the end of the light source connector 19b. When the light source connector 19b is connected to the light source apparatus 12, the input facet of the optical fiber 34 is inserted into the interior of the light source apparatus 12. The illumination light from the light source apparatus 12 is guided to the tip portion 13c by the optical fiber 34, and irradiated into the interior of the body cavities from the light diffusing element 33.

The forceps outlet 27 is connected to the forceps opening 17 via a forceps channel 35. The forceps channel 35 is a cylindrical member formed by resin, for example. In the case that a diseased site is to be cut open while under observation with the endoscope, an electric scalpel 36 (high frequency scalpel), which is a treatment implement, is inserted into the forceps channel 35 through the forceps opening 17.

The processing apparatus 11 is equipped with a socket 40 that engages the communications connector 19a of the universal cord 15. The socket 40 is assembled into a housing 41 via an insulator (not shown) to electrically isolate the main body of the processing apparatus 11 and the connector 19. The housing 41 is grounded to earth. When the communications connector 19a is engaged with the socket 40, the CCD 30 is connected to the timing/driver circuit 42 and the DSP 43.

The timing/driver circuit 42 generates control signals (clock pulses) in response to commands from a CPU 44, and inputs the control signals to the CCD 30 via the signal cables 32. The control signals control the timings at which accumulated electric charges are read out from the CCD 30, the shutter speed of an electronic shutter of the CCD 30, etc. The DSP 43 administers color separation, color interpolation, gain correction, white balance adjustment, gamma correction, etc., on the image signals which are input via the signal cables 32, to generate image data. The image data are converted into analog signals by a digital/analog converter 45, and displayed on the monitor 20 as an endoscope image.

The light source apparatus 12 is equipped with: a light source 50; a light source driver 51; a diaphragm adjusting mechanism 52; an iris driver 53; and a CPU 54 that controls the other components. The light source 50 is turned ON and OFF according to control exerted by the light source driver 51, to irradiate illumination light toward a focusing lens 55 provided forward of the light source 50. Examples of the light source 50 include: a xenon lamp; a halogen lamp; an LED (Light Emitting Diode); a fluorescent light emitting element; and an LD (Laser Diode). The light source 50 is selected as appropriate according to the type of endoscope image (a visible image, a fluorescence image, etc.) is to be obtained, that is, the wavelength of light to be utilized.

The diaphragm adjusting mechanism 52 is provided between the light source 50 and the focusing lens 55, and adjusts the amount of illumination light such that the endoscope images obtained by the CCD 30 are of a substantially uniform brightness. The diaphragm adjusting mechanism 52 is equipped with: diaphragm wings that change the diameter (aperture diameter) of an aperture that the illumination light passes through; and a motor for driving the diaphragm wings. The iris driver 53 opens and closes the diaphragm wings of the diaphragm adjusting mechanism 52, to change the area that the illumination light passes through thereby adjusting the amount of illumination light that enters the optical fiber 34.

The flexible tube portion 13a of the probe 13 is constituted by: a flexible helical tube; a net that prevents stretching of the helical tube; and an outer layer which is a resin coating on the net. A plurality of the signal cables 32, the forceps channel 35, and the optical fiber 34 are fed through the interior of the flexible tube portion 13a parallel to and in proximity to each other.

Next, the operation of the endoscope system 2 configured as described above will be described. When the electronic endoscope 10 is connected to the processing apparatus 11, the CCD 30 is connected to the timing/driver circuit 42 and the DSP 43. When the power source of the endoscope system 2 is switched ON, the processing apparatus 11 and the light source apparatus 12 initiate operations. The light source 50 of the light source apparatus 12 is turned ON, and illumination light is emitted toward the focusing lens 55. The illumination light is guided by the focusing lens 55 to the input end of the optical fiber 23, then guided to the tip portion 13c of the electronic endoscope 10. After the probe portion 13 of the electronic endoscope 10 is inserted within a body cavity and the illumination light guided by the optical fiber 34 propagates within the light diffusing element 33, the illumination light is irradiated onto a portion to be observed. As illustrated in FIG. 4, a portion of light $L_0$ that propagates through the light diffusing element 33 is reflected in the rearward direction by the semireflective surface $S_1$ formed by the semireflective film 38. Ideally, the remainder of the light is transmitted through the semireflective surface $S_1$. Here, as described previously, "rearward" refers to a direction opposite a "frontward" direction. Specifically, in the case that the direction that light output from the output end of the optical fiber 34 propagates (frontward) in FIG. 4 is designated as the positive direction along an x axis, the "rearward" direction is the negative direction along the x axis. The amount of the portion of the illumination light which is reflected is not particularly limited, and can be set by the configuration of the semireflective surface $S_1$. However, it is preferable for the semireflective surface $S_1$ to be designed to have a reflectance within a range from 35% to 85% (energy conversion) from the viewpoint of maximizing the light emitting area of the light diffusing element 33 as a secondary light source. It is more preferable for the reflectance to be within a range from 40% to 80%, and most preferable for the reflectance to be within a range from 45% to 75%.

The light which is transmitted through the semireflective surface $S_1$ is utilized as illumination light Lt, which illuminates a region comparatively close to the optical axis C of the optical fiber 34. Meanwhile, the light which is reflected rearward by the semireflective surface $S_1$ is reflected by the totally reflective film 39, which is coated on the side of the light diffusing element 33 toward a light input surface thereof. The light undergoes a single or a plurality of such reciprocal reflections, then is output from the light output surface $S_0$. The light which is output in this manner is utilized as illumination light Lr that illuminates regions comparatively far from the optical axis C. $W_1$ in FIG. 4 denotes the width of a light emitting area based on light Lt, which is not reflected by the semireflective surface $S_1$ and is transmitted therethrough (that is, $W_1$ corresponds to the width of a light emitting area of a conventional light diffusing element). $W_2$ in FIG. 4 denotes the width of a light emitting area in the case that the light Lr, which is output after being reflected by the semireflective surface $S_1$, is also included. As illustrated in FIG. 4, propagation of light in directions away from the optical axis C is promoted within the light diffusing element 33. Therefore, $W_2$ becomes greater than $W_1$, and the light emitting area of the secondary light source is enlarged.

Then, an image of a portion to be observed, which is illuminated by the illumination light, is obtained by the CCD 30. The image signals output from the CCD 30 undergoes various processes in the analog processing circuit of the circuit board 31, then are input to the DSP 43 of the processing apparatus 11 via the signal cables 32. The DSP 43 administers various signal processes onto the input image signals, and generates image data. The generated image data are displayed as an endoscope image on the monitor 20 via the D/A converter 45.

In the case that treatment of a diseased site is necessary under endoscope observation, the electric scalpel 36 is inserted into the forceps channel 35 through the forceps opening 17. Then, the tip of the electric scalpel 36, to which high frequency electric current is applied, is caused to contact the diseased site to cut and cauterize the diseased site.

As described above, the light diffusing element of the present invention and the light guide for an endoscope equipped with the light diffusing element have the semireflective surface that reflects a portion of the light, provided to intersect with at least the optical axis of the optical fiber. Thereby, propagation of light in directions away from the optical axis of the optical fiber can be promoted during the step of reflecting the portion of the light that enters the light diffusing element. As a result, it becomes possible for light to reach portions of the light diffusing element away from the optical axis of the optical fiber, in the light diffusing element and the light guide for an endoscope equipped with the light diffusing element.

[Design Modifications to the Light Diffusing Element]
<First Design Modification>

In the description of the light diffusing element according to the first embodiment and the light guide for an endoscope equipped with the light diffusing element, the semireflective surface $S_1$ was formed by a semireflective film 38 provided on the light output surface of the light diffusing element 33. However, the light diffusing element and the light guide for an endoscope equipped with the light diffusing element of the present invention are not limited to such a configuration.

Figure 5A:
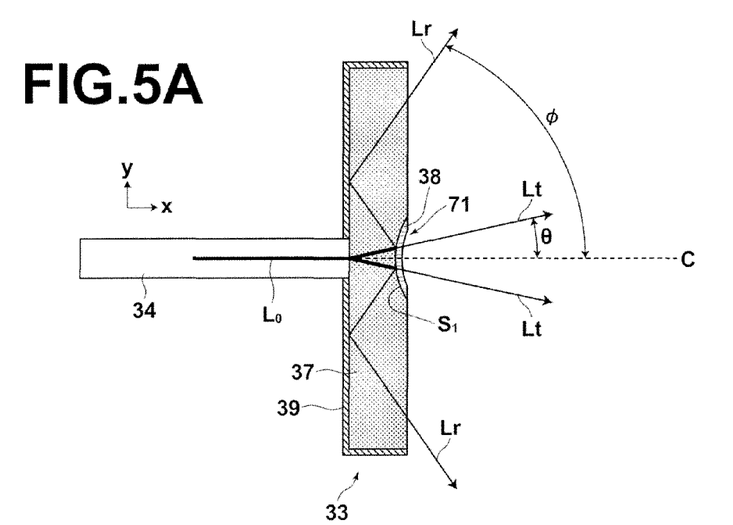
FIG. 5A is a diagram that schematically illustrates the structure of a light guide for an endoscope which is designed such that a semireflective surface formed as a curved surface protrudes rearward.

For example, the semireflective surface $S_1$ may be designed to be of a shape that protrudes rearward, as illustrated in FIGS. 5A and 5E. A semireflective surface $S_1$ having such a configuration may be produced by molding the light transmitting member 37 of the light diffusing element 33 such that the portion thereof that intersects with the optical axis C is recessed, and by forming the semireflective film 38 on the recessed portion 71.

FIG. 5A is a diagram that schematically illustrates the structure of a light guide for an endoscope which is designed such that the semireflective surface $S_1$, which is formed as a curved surface, protrudes rearward. Even if the light diffusing element 33 having this configuration is employed, a portion of the illumination light $L_o$ that propagates through the light diffusing element 33 is reflected in the rearward direction by the semireflective surface $S_1$ formed by the semireflective film 38. Ideally, the remainder of the light is transmitted through the semireflective surface $S^1$. The light which is transmitted through the semireflective surface $S_1$ is utilized as illumination light Lt, which illuminates a region comparatively close to the optical axis C. Meanwhile, the light which is reflected rearward by the semireflective surface $S_1$ is reflected frontward by the totally reflective film 39, which is coated on the side of the light diffusing element 33 toward a light input surface thereof, then is output from the light diffusing element 33. In the case that the semireflective surface $S_1$ is designed as a rearwardly protruding shape, it becomes possible for the semireflective surface to intersect a plane perpendicular to the optical axis C. This means that when a plane, which is a cross section that includes the optical axis C, is considered, the semireflective surface can be formed at an angle with respect to the plane perpendicular to the optical axis C. In this case, light which is reflected by the semireflective surface $S_1$ is reflected in directions at twice the angle compared to a case in which light is reflected by a surface perpendicular to the optical axis. Thereby, the light diffusing element illustrated in FIG. 5A can promote propagation of light in directions further from the optical axis of the optical fiber compared to the case illustrated in FIG. 4. Further, by the effect of the aforementioned angle of inclination, the diffusion angle $\phi$ of the light Lr which is reflected rearward by the semireflective surface $S_1$ then output thereafter becomes greater than the diffusion angle $\theta$ of the light Lt which is transmitted through the semireflective surface $S_1$. Thereby, the diffusion angle of light which is output from the light diffusing element 33 is increased as a whole, and it becomes possible to easily illuminate an even wider region.

Figure 5B:
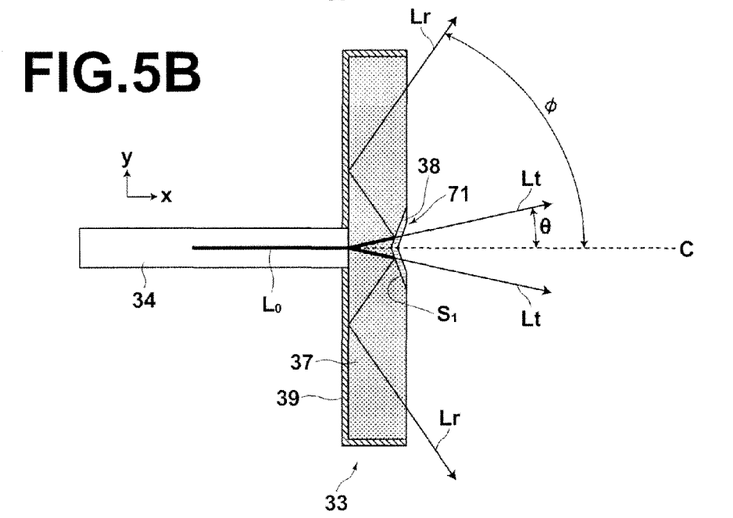
FIG. 5B is a diagram that schematically illustrates the structure of a light guide for an endoscope which is designed such that a semireflective surface formed as a cone protrudes rearward.
Figure 6A:
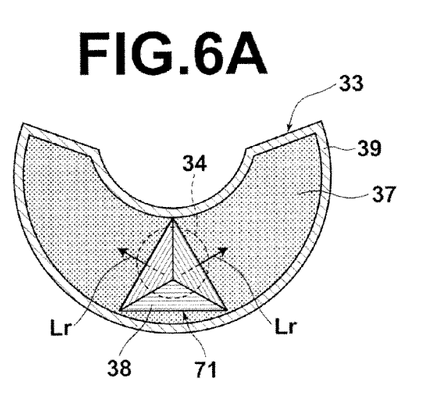
FIG. 6A is a front view that schematically illustrates the structure of the light diffusing element of FIG. 5B in the case that the conical semireflective film is formed as a triangular cone.

FIG. 5B is a diagram that schematically illustrates the structure of a light guide for an endoscope which is designed such that a semireflective surface $S_1$ formed as a cone protrudes rearward. Examples of conical shapes include circular cones and polygonal cones, such as triangular cones. Forming the semireflective surface $S_1$ as a cone is advantageous in that the design for imparting the semireflective surface with an angle with respect to a plane perpendicular to the optical axis C is facilitated. Further, in the case that the conical shape is a polygonal cone, the lateral surfaces thereof can be set as appropriate in order to more effectively promote propagation of light into predetermined directions within the light diffusing element 33. Specifically, FIG. 6A is a front view that schematically illustrates the structure of the light diffusing element of FIG. 5B in the case that the conical semireflective film is formed as a triangular cone. In FIG. 6A, two of the three lateral surfaces of the triangular cone are oriented so as to enable light to be reflected in directions away from the optical axis of the optical fiber. The orientations of the lateral surfaces are set as appropriate according to the directions in which light is to be reflected. It is not necessary for the axis of the conical shape of the semireflective surface $S_1$ and the optical axis of the optical fiber 34 to be matched. The distribution of light energy can be set as appropriate by shifting the axis of the conical shape of the semireflective surface $S_1$ and the optical axis of the optical fiber 34, for example.

<Design Modification 2>

In the description of Design Modification 1, the light diffusing element and the light guide for an endoscope equipped with the light diffusing element were described as a case in which the semireflective surface $S_1$ was formed as a rearwardly protruding shape. However, the light diffusing element and the light guide for an endoscope equipped with the light diffusing element of the present invention are not limited to such a configuration.

Figure 6B:
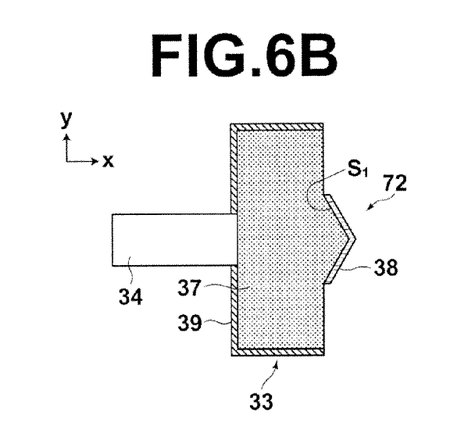
FIG. 6B is a diagram that schematically illustrates the structure of a light guide for an endoscope which is designed such that a semireflective surface formed as a cone protrudes frontward.

For example, FIG. 6B is a diagram that schematically illustrates the structure of a light guide for an endoscope which is designed such that a semireflective surface formed as a cone protrudes frontward. A semireflective surface $S_1$ having such a configuration may be produced by molding the light transmitting member 37 of the light diffusing element 33 such that the portion thereof that intersects with the optical axis C protrudes, and by forming the semireflective film 38 on the protruding portion 72.

<Design Modification 3>

In the description of the light diffusing element according to the first embodiment and the light guide for an endoscope equipped with the light diffusing element, the semireflective surface $S_1$ was formed by a semireflective film 38. However, the light diffusing element and the light guide for an endoscope equipped with the light diffusing element of the present invention are not limited to such a configuration.

Figure 7A:
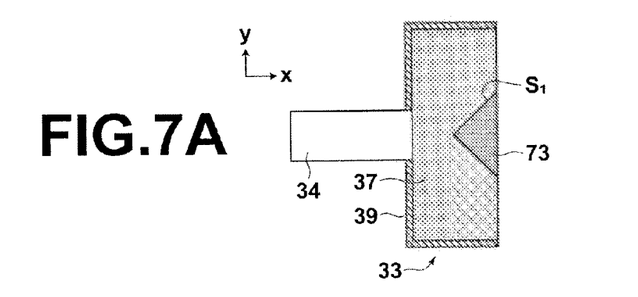
FIG. 7 is a collection of sectional diagrams that schematically illustrate examples of a second embodiment of the light guide for an endoscope of the present invention.
Figure 7B:
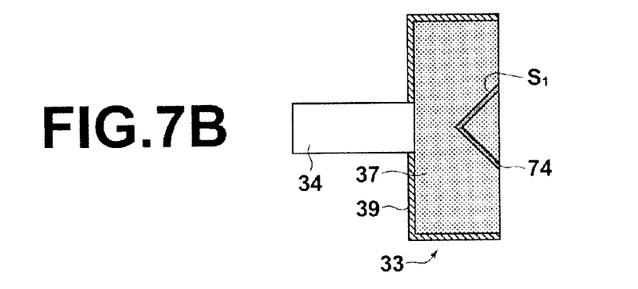
Figure 7C:
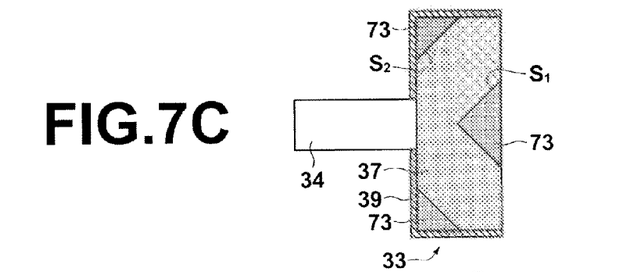
Figure 7D:
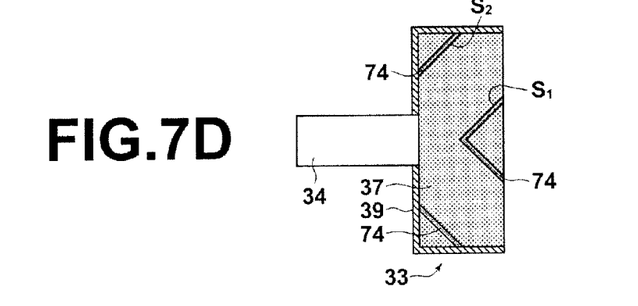

For example, the semireflective surface $S_1$ may be an interface between materials having different refractive indices. Such a structure can be produced by produced by molding the light transmitting member 37 of the light diffusing element 33 such that the portion thereof that intersects with the optical axis C is recessed, and by filing the recessed portion with a material having a refractive index less than that of the light transmitting member 37, as illustrated in FIG. 7A. Alternatively, an air gap may be formed in the recessed portion, as illustrated in FIG. 7B. This configuration yields the advantageous effect that the process of forming the semireflective film can be omitted, resulting in the light diffusing element being able to be produced at low cost. Glass or an adhesive agent may be employed as the material having a refractive index less than that of the light transmitting member 37. In addition, material 73 having a different refractive index or an air gap 74 may be employed to form a second reflective surface $S_2$ that reflects a portion of the light reflected by the semireflective surface $S_1$, which is a first reflective surface, frontward as illustrated in FIGS. 7C and 7D.

<Design Modification 4>

In the description of the light diffusing element according to the first embodiment and the light guide for an endoscope equipped with the light diffusing element, a case was described in which the light transmitting member 37 is that in which fine scattering particles are dispersed. However, the light diffusing element and the light guide for an endoscope equipped with the light diffusing element of the present invention are not limited to such a configuration.

Figure 8A:
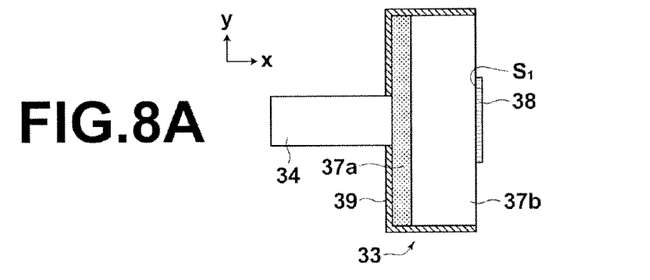
FIG. 8 is a collection of sectional diagrams that schematically illustrate examples of a third embodiment of the light guide for an endoscope of the present invention.
Figure 8B:
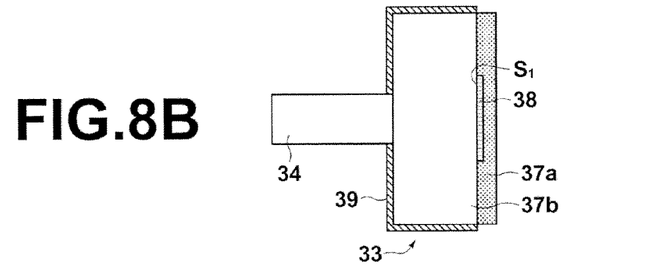
Figure 8C:
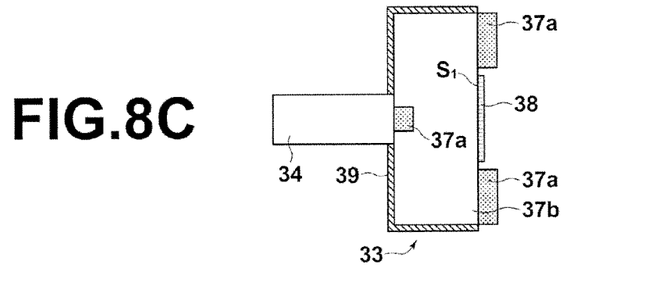

For example, a light transmitting member may be constituted by a region 37a that includes fine scattering particles, and a region 37b that does not include fine scattering particles, as illustrated in FIGS. 8A, 8B, and 8C. In this case, the light transmitting member is designed such that light output from the optical fiber 34 passes through the region 37a at least once. FIG. 8A is a diagram that illustrates the structure of a light diffusing element in which the region 37a that includes the fine scattering particles is provided toward the light input side of the light transmitting member. Such a structure may be produced by coating the fine scattering particles to form a scattering surface.

Note that when forming a scattering surface on the surface of the light transmitting member, the scattering surface of the light diffusing element is not limited to that which employs fine scattering particles. The scattering surface may be formed by polishing a surface of the light transmitting member with a lapping sheet (for example, LFG1P by Thorlabs). As another example, the scattering surface may be produced by forming a micro lens array.

FIG. 8B is a diagram that illustrates the structure of a light diffusing element in which the region 37a that includes the fine scattering particles is provided toward the light output side of the light transmitting member. In the case that the configuration of FIG. 8B is adopted, no fine scattering particles are present between the output end of the optical fiber 34 and the semireflective surface $S_1$. Therefore, control of the optical paths of light reflected by the semireflective surface $S_1$ is facilitated. Accordingly, uniformization of the intensity of light at the light output surface $S_0$ of the light diffusing element is facilitated. As another alternative, regions 37a that include the fine scattering particles may be provided at portions of both the light input side and the light output side of the light transmitting member 37, as illustrated in FIG. 8C.

<Design Modification 5>

Figure 9A:
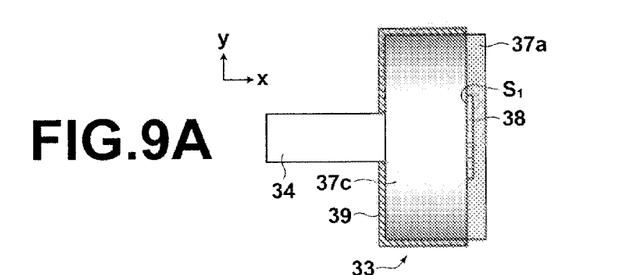
FIG. 9 is a collection of diagrams that illustrate an example of a fourth embodiment of the light guide for an endoscope of the present invention.
Figure 9B:
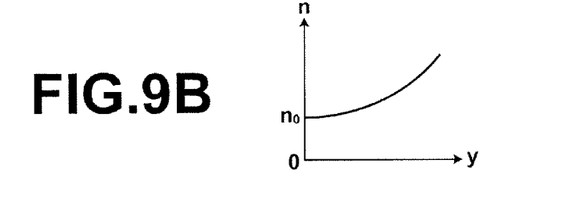

In the light diffusing element of the present invention and the light guide for an endoscope equipped with the light diffusing element, a light transmitting member 37c, in which the refractive index becomes greater as the distance from the optical axis of the optical fiber 34 increases, may be employed as illustrated in FIG. 9A. FIG. 9B is a graph that illustrates the distribution of refractive indices within the light transmitting member 37c in the y axis direction, using the optical axis as a reference along the y axis. In the graph, n0 denotes the refractive index of the light transmitting member 37a along the optical axis.

<Design Modification 6>

In the description of the light diffusing element according to the first embodiment and the light guide for an endoscope equipped with the light diffusing element, a case was described in which the light diffusing element 33 and the optical fiber 34 are in close contact. However, the light diffusing element and the light guide for an endoscope equipped with the light diffusing element of the present invention are not limited to such a configuration.

Figure 10A:
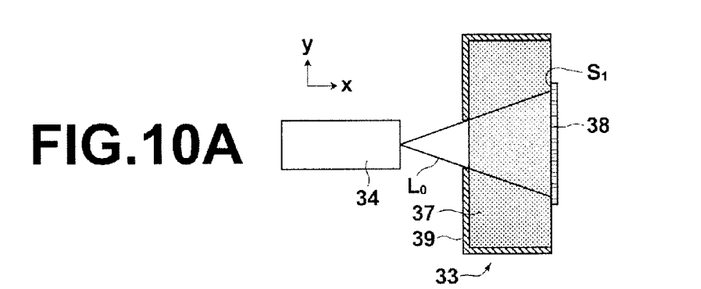
FIG. 10 is a collection of sectional diagrams that schematically illustrate examples of a fifth and a sixth embodiment of the light guide for an endoscope of the present invention.

For example, the light diffusing element 33 and the optical fiber 34 may be separated from each other as illustrated in FIG. 10A. Thereby, the size of the secondary light source formed on the light diffusing element can be increased, and an advantageous effect that the beam can be made more uniform can be obtained.

<Design Modification 7>

Figure 10B:
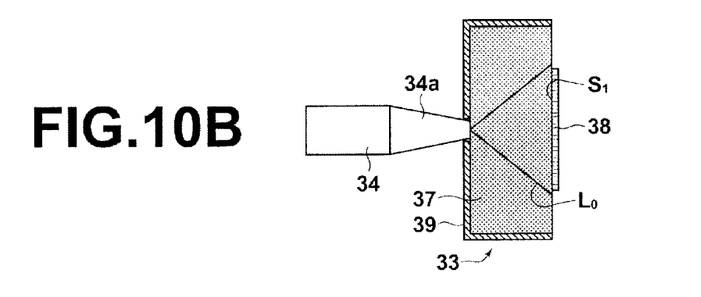

The light diffusing element of the present invention and the light guide for an endoscope equipped with the light diffusing element may employ an optical fiber 34 having a tapered portion 34a, as illustrated in FIG. 10B. The tapered portion 34a is in the vicinity of the output facet of the optical fiber 34 and is of a tapered shape in which the core of the optical fiber becomes thinner toward the output facet. Thereby, the diffusion angle of the light output from the output end of the optical fiber 34 can be increased, and an advantageous effect that light can be enabled to reach portions of the light diffusing element farther from the optical axis of the optical fiber is obtained.

<Design Modification 8>

In the description of the light diffusing element according to the first embodiment and the light guide for an endoscope equipped with the light diffusing element, the totally reflective film 39 was employed to form a surface that reflects the light reflected by the semireflective surface $S_1$ frontward. However, the light diffusing element and the light guide for an endoscope equipped with the light diffusing element of the present invention are not limited to such a configuration.

Figure 11:
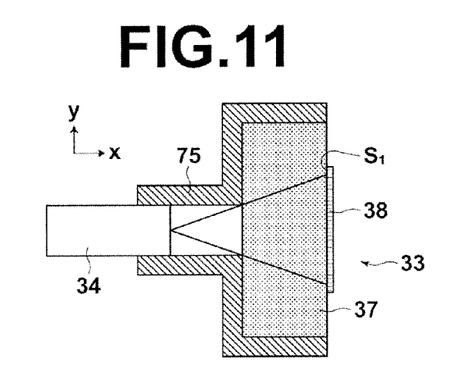
FIG. 11 is a sectional diagram that schematically illustrates a seventh embodiment of the light guide for an endoscope of the present invention.

For example, the light diffusing element 33 constituted by the light transmitting member 37 and the semireflective film 38 may be fitted into a reflective member 75 that reflects the light reflected by the semireflective surface $S_1$ frontward, as illustrated in FIG. 11. The reflective member 75 may be formed by a metal material.

In addition, in the case that the light diffusing element 33 and the optical fiber 34 are separated from each other as described above and the reflective member 75 is appropriately designed, the semireflective surface may be provided on the surface at the light input side of the light diffusing element 33. Such a semireflective surface may be produced by forming a metal film as the semireflective film on the surface of the light diffusing element 33 at the light input side thereof.

What is claimed is:

1. A light diffusing element, for diffusing light output from an output facet of an optical fiber that enters the light diffusing element at a first end and outputting the diffused light from a second end, comprising:
    the first end;
    the second end; and
    a semireflective surface for reflecting a portion of the light, provided at a predetermined portion of the light diffusing element corresponding to the core of the output facet, the semireflective surface intersecting at least with the optical axis of the optical fiber,
    wherein the semireflective surface is formed by a semireflective film provided on the predetermined portion of a diffusion output surface, from which the light is output,
    the semireflective surface reflects the portion of the light rearward, and
    the semireflective surface is shaped as a protrusion that protrudes rearward.

2. A light diffusing element as defined in claim 1, wherein:
    the semireflective surface is of a conical shape.

3. A light diffusing element as defined in claim 2, wherein:
    the semireflective surface is of a polygonal conical shape constituted by a plurality of surfaces.

4. A light diffusing element as defined in claim 1, further comprising:
    a totally reflective film which is coated on a surface of the light diffusing element, such that the light reflected by the semireflective surface, is reflected frontward.

5. A light diffusing element as defined in claim 1, further comprising:
    a second reflective surface, for reflecting a portion of the light reflected by the semireflective surface, which comprises a first reflective surface, frontward.

6. A light guide for an endoscope that diffuses light which is output from an output facet of an optical fiber and enters the light guide at a first end and outputs the diffused light from a second end, comprising:
    the optical fiber; and
    a light diffusing element,
    the light diffusing element being equipped with a semireflective surface for reflecting a portion of the light, provided at a predetermined portion of the light diffusing element corresponding to the core of the output facet, the semireflective surface intersecting at least with the optical axis of the optical fiber, and
    the semireflective surface being formed by a semireflective film provided on the predetermined portion of a diffusion output surface, from which the light is output,
    the semireflective surface reflects the portion of the light rearward,
    the semireflective surface is shaped as a protrusion that protrudes rearward.

7. A light guide for an endoscope as defined in Claim 6, wherein:
    the semireflective surface is of a conical shape.

8. A light guide for an endoscope as defined in claim 7, wherein:
    the semireflective surface is of a polygonal conical shape constituted by a plurality of surfaces.

9. A light guide for an endoscope as defined in claim 6, further comprising:
    a totally reflective film which is coated on a surface of the light diffusing element, such that the light reflected by the semireflective surface, is reflected frontward.

10. A light guide for an endoscope as defined in claim 6, further comprising:
   a reflective member, for reflecting a portion of the light reflected by the semireflective surface, frontward.

11. A light guide for an endoscope as defined in claim 6, wherein:
   the optical fiber and the light diffusing element are separated by a predetermined distance.

12. A light guide for an endoscope that diffuses light which is output from an output facet of an optical fiber and enters the light guide at a first end and outputs the diffused light from a second end, comprising:
   the optical fiber; and
   a light diffusing element,
   the light diffusing element being equipped with a semireflective surface for reflecting a portion of the light, provided at a predetermined portion of the light diffusing element corresponding to the core of the output facet, the semireflective surface intersecting at least with the optical axis of the optical fiber,
   the semireflective surface being formed by a semireflective film provided on the predetermined portion of a diffusion output surface, from which the light is output; and
   the optical fiber has a tapered portion in the vicinity of the output facet such that the core of the optical fiber is of a tapered shape that becomes thinner toward the output facet.

* * * * *